(12) United States Patent
Buettgen et al.

(10) Patent No.: US 10,359,505 B2
(45) Date of Patent: Jul. 23, 2019

(54) OPTICAL IMAGING MODULES AND OPTICAL DETECTION MODULES INCLUDING A TIME-OF-FLIGHT SENSOR

(71) Applicant: ams Sensors Singapore Pte. Ltd., Singapore (SG)

(72) Inventors: Bernhard Buettgen, Adliswil (CH); Miguel Bruno Vaello Paños, Zurich (CH); Stephan Beer, Schaffhausen (CH); Michael Lehmann, Winterthur (CH); Daniel Pérez Calero, Zurich (CH); Sophie Godé, Zurich (CH); Bassam Hallal, Thalwil (CH)

(73) Assignee: ams Sensors Singapore Pte. Ltd., Singapore (SG)

( * ) Notice: Subject to any disclaimer, the term of this patent is extended or adjusted under 35 U.S.C. 154(b) by 8 days.

(21) Appl. No.: 15/124,045

(22) PCT Filed: Mar. 13, 2015

(86) PCT No.: PCT/EP2015/055357
§ 371 (c)(1),
(2) Date: Sep. 7, 2016

(87) PCT Pub. No.: WO2015/136099
PCT Pub. Date: Sep. 17, 2015

(65) Prior Publication Data
US 2017/0090018 A1 Mar. 30, 2017

Related U.S. Application Data

(60) Provisional application No. 61/987,045, filed on May 1, 2014, provisional application No. 61/981,235, filed
(Continued)

(51) Int. Cl.
*G01C 3/08* (2006.01)
*G01S 7/481* (2006.01)
(Continued)

(52) U.S. Cl.
CPC ............ *G01S 7/4813* (2013.01); *G01S 7/497* (2013.01); *G01S 7/4915* (2013.01);
(Continued)

(58) Field of Classification Search
CPC ............................... G01S 7/4813; G01S 17/89
See application file for complete search history.

(56) References Cited

U.S. PATENT DOCUMENTS 7,586,077 B2 9/2009 Lehmann et al.
8,604,436 B1 12/2013 Patel et al.
(Continued)

FOREIGN PATENT DOCUMENTS

CN 102652431 A 8/2012
CN 102713572 A 10/2012
(Continued)

OTHER PUBLICATIONS

Australian Patent Office, International Search Report and Written Opinion for International Patent Application No. PCT/EP2015/055357, dated Nov. 23, 2015.
Intellectual Property Office of Taiwan, Search Report issued in Taiwan Application No. 104108361, dated Jan. 2, 2019, 1 page.

*Primary Examiner* — Samantha K Abraham
(74) *Attorney, Agent, or Firm* — Fish & Richardson P.C.

(57) ABSTRACT

The present disclosure describes optical imaging and optical detection modules that include sensors such as time-of-flight (TOF) sensors. Various implementations are described that, in some instances, can help reduce the amount of optical cross-talk between active detection pixels and reference pixels and/or can facilitate the ability of the sensor to determine an accurate phase difference to be used, for example, in distance calculations.

12 Claims, 12 Drawing Sheets

Related U.S. Application Data on Apr. 18, 2014, provisional application No. 61/953,089, filed on Mar. 14, 2014.

(51) Int. Cl.
*G01S 17/89* (2006.01)
*G01S 7/497* (2006.01)
*G01S 7/491* (2006.01)
G01J 1/02 (2006.01)
G01J 1/42 (2006.01)
G01J 1/04 (2006.01)

(52) U.S. Cl.
CPC ............ *G01S 7/4918* (2013.01); *G01S 17/89* (2013.01); *G01J 1/0214* (2013.01); *G01J 1/0422* (2013.01); *G01J 2001/4247* (2013.01)

(56) References Cited

U.S. PATENT DOCUMENTS

| | | |
|---|---|---|
| 2009/0020687 A1 | 1/2009 | Lehmann et al. |
| 2011/0133941 A1 | 6/2011 | Yao et al. |
| 2011/0157444 A1 | 6/2011 | Gerstenberger et al. |
| 2011/0306143 A1 | 12/2011 | Chiou et al. |
| 2012/0033045 A1 | 2/2012 | Schweizer et al. |
| 2013/0099101 A1 | 4/2013 | Campbell |
| 2013/0153755 A1 | 6/2013 | Pikkujamsa et al. |

FOREIGN PATENT DOCUMENTS

| | | |
|---|---|---|
| EP | 1 195 617 B1 | 10/2002 |
| EP | 2 017 651 A2 | 1/2009 |
| TW | 201312144 A1 | 3/2013 |

OPTICAL IMAGING MODULES AND OPTICAL DETECTION MODULES INCLUDING A TIME-OF-FLIGHT SENSOR

CROSS-REFERENCE TO RELATED APPLICATION(S)

This application claims the benefit of priority of the following U.S. Provisional Patent Application Ser. Nos. 61/953,089 filed on Mar. 14, 2014; Ser. No. 61/981,235 filed on Apr. 18, 2014; and Ser. No. 61/987,045 filed on May 1, 2014. The contents of the prior applications are incorporated herein by reference.

BACKGROUND

Some handheld computing devices such as smart phones can provide a variety of different optical functions such as one-dimensional (1D) or three-dimensional (3D) gesture detection, 3D imaging, proximity detection, ambient light sensing, and/or front-facing two-dimensional (2D) camera imaging.

TOF-based systems, for example, can provide depth and/or distance information. In general, TOF systems are based on the phase-measurement technique of emitted intensity-modulated light, which is reflected by a scene. The reflected light is imaged onto a sensor, and the photo-generated electrons are demodulated in the sensor. Based on the phase information, the distance to a point in the scene for each pixel is determined by processing circuitry associated with the sensor.

Additionally, TOF-based systems can provide depth and/or distance information via a pulse-measurement technique. The pulse-measurement technique employs an emitter and sensor as above; however, distance is determined by tallying the time for emitted light to reflect back onto the sensor.

Integrating TOF sensors into devices such as smart phones, tablets or other handheld devices, however, can be challenging for several reasons. First, space in the host device typically is at premium. Thus, there is a need to achieve accurate TOF sensors having a relatively small height. Second, the size of the dies impacts production costs. Accordingly, it is desirable to achieve TOF sensors having a relatively small foot print.

While the foregoing issues also may be applicable to other types of optical imaging or detection sensors, another potential problem is more specific to TOF sensors. In particular, the distance measurements obtained by the pixels should be robust against phase delays caused, for example, by thermal drifting effects. To address such concerns, in some TOF chips, a self-calibration of the TOF distance measurement is achieved by providing reference pixels that measure light from the illumination source. The use of such reference pixels necessitates directing some of the light from the illumination source to the reference pixels, which may need to be separated optically from the active pixels used to measure the distance to the scene.

TOF-based distance measurements via the pulsed-measurement technique should be robust against thermal drifting effects. For example, in some instances the precise time for commencement of the initial emission of light from the emitter may be obscured by thermal drifting effects.

SUMMARY

The present disclosure describes optical imaging and optical detection modules that include sensors such as time-of-flight (TOF) sensors.

Various implementations are described that, in some instances, can help reduce the amount of optical cross-talk between the active detection pixels and the reference pixels and/or can facilitate the ability of the sensor to determine an accurate phase difference to be used, for example, in distance calculations.

In one aspect, this disclosure describes an optoelectronic module that includes an illumination source, a sensor including spatially distributed detection pixels and at least one reference pixel, an optics member disposed over the illumination source and the sensor, and a light barrier separating an emission chamber of the module from a detection chamber of the module. The optics member has a first transmissive region over the illumination source and a second transmissive region over the detection pixels. The illumination source and the at least one reference pixel are in the emission chamber, whereas the detection pixels are in the detection chamber. Also, optoelectronic module includes at least one of: (i) a partially reflective coating on a surface of the first transmissive region over the illumination source or (ii) a reflective coating on a surface of the emission chamber, wherein the coating is arranged such that some light from the illumination source is reflected by the coating toward the at least one reference pixel.

In another aspect, an optoelectronic module includes a coating on a surface of the optic member's transmissive region over the illumination source, wherein the coating is at least one of an optical filter coating, a partially-reflective coating, an anti-reflective coating or a non-transmissive coating.

In yet another aspect, an optoelectronic module includes one or more micro lenses disposed over the detection pixels and/or the reference pixel(s).

According to a further aspect, each of one or more detection and/or reference pixels is at least partially surrounded laterally by a shield of one or more layers that narrow an effective field of view for the pixel.

In accordance with another aspect, an optoelectronic module includes a printed circuit board, and an illumination source mounted on or in the printed circuit board. The module further includes spatially distributed detection pixels and at least one reference pixel implemented in one or more semiconductor sensor that are embedded within the printed circuit board.

A further aspect describes a method of determining a distance to an object using a time-of-flight sensor that includes active demodulation detection pixels and one or more reference pixels. The method includes integrating the active demodulation detection pixels during a first integration period and integrating the one or more reference pixels during a second integration period different from the first integration period. Signals are read out from the active demodulation detection pixels during a first read-out period after the first integration period, and signals are read out from the one or more reference pixels during a second read-out period after the second integration period.

As described in accordance with another aspect, an optoelectronic module includes control logic configured to tune an integration time of at the reference pixel(s).

Another aspect relates to a method of determining a distance to an object using a time-of-flight sensor module that includes demodulation detection pixels and one or more reference pixels. The method includes measuring sensed values from a particular demodulation detection pixel and from a particular reference pixel, and determining a phase difference based, at least in part, on the sensed values and based on stored sensitivity values, wherein the sensitivity values are indicative of amounts of optical cross-talk between the particular demodulation detection pixel and the particular reference pixel. The module can include processing logic to implement the method.

In yet another aspect, an optoelectronic module includes a transmissive member disposed over the illumination source and the sensor. A respective black chrome coating is on opposite surfaces of the transmissive member, wherein each of the black chrome coatings defines a transmissive window that allows light from the illumination source to pass through to outside the module. Openings are provided in a portion of the black chrome coating on a sensor-side of the transmissive member in a vicinity of the at least one reference pixel. In some cases, the presence of the black chrome coating can enhance the amount of light reflected to the reference pixels; providing part of the black chrome coating as a pattern can be used to prevent an excessive amount of light from being incident on the reference pixels.

Other aspects, features and advantages will be readily apparent from the following detailed description, the accompanying drawings, and the claims.

DETAILED DESCRIPTION

Figure 1:
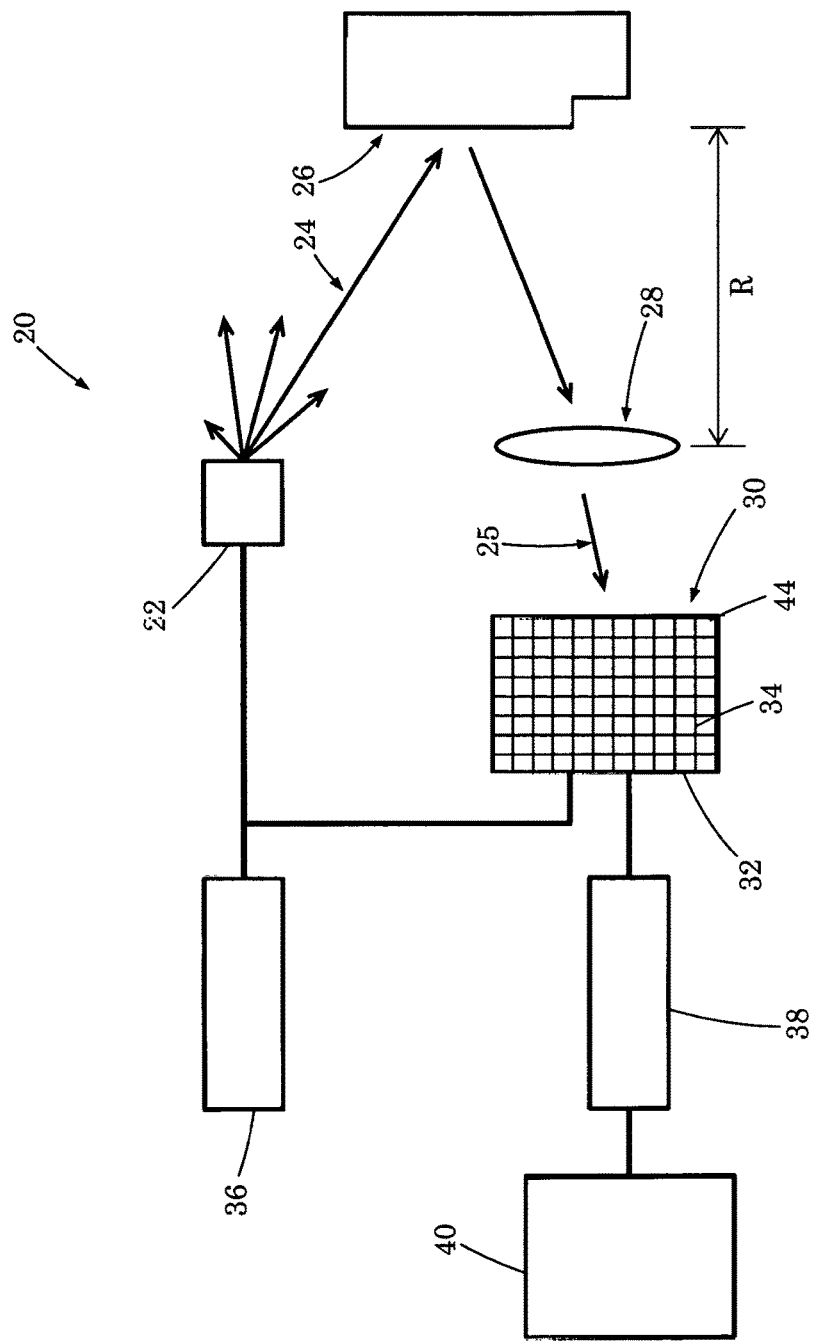
FIG. 1 illustrates general operation of a TOF camera system.

As shown in FIG. 1, a TOF camera system 20 includes an illumination source 22. Modulated emitted illumination light 24 from the source 22 is directed toward a scene 26 that includes one or more objects. A fraction of the total optical power directed to the scene is reflected back to the camera 20, through optics 28, and is detected by a 3D imaging sensor 30. The sensor 30 includes a 2D pixel matrix 32 of demodulation pixels 34. Each pixel 34 is capable of demodulating the impinging light signal 25 that is collected by the optics 28 (e.g., a lens) and imaged onto the imaging sensor 30. An electronics control unit 36 controls the timing of the illumination module 22 and sensor 30 to enable its synchronous detection.

The demodulation values allow for each pixel 34 to compute the time-of-flight, which, in turn, directly corresponds to the distance information (R) of the corresponding point in the scene 26. The 2D gray scale image with the distance information can be converted into a 3D image at the data output interface 38 that includes an image processor and/or other control and processing logic (e.g., micropro-cessor and/or other circuitry). The 3D image can be displayed to a user, for example, on a display 40 or can be used as machine vision input.

The time-of-flight (TOF) is obtained by demodulating the light signals reflected from the scene 26 and that impinge on the active pixels 34 of the sensor 30. Different modulation techniques are known, for example pseudo-noise modulation, pulse modulation and continuous modulation. The distance to the object for each pixel then can be calculated based on the detected signals using known techniques.

The sensor 30 can be implemented, for example as an integrated semiconductor chip that also includes a region (e.g., a row) of reference pixels 44. During operation, a fraction of the light from the forward path of the illumination source 22 is fed back to one or more reference pixels 44. The signals detected by the reference pixels 44 can be used to re-calculate a zero-distance with every frame, thereby facilitating self-calibration of the TOF distance measurement. The sensor chip also can include, for example, control logic, decoder logic and read-out logic.

Figure 2:
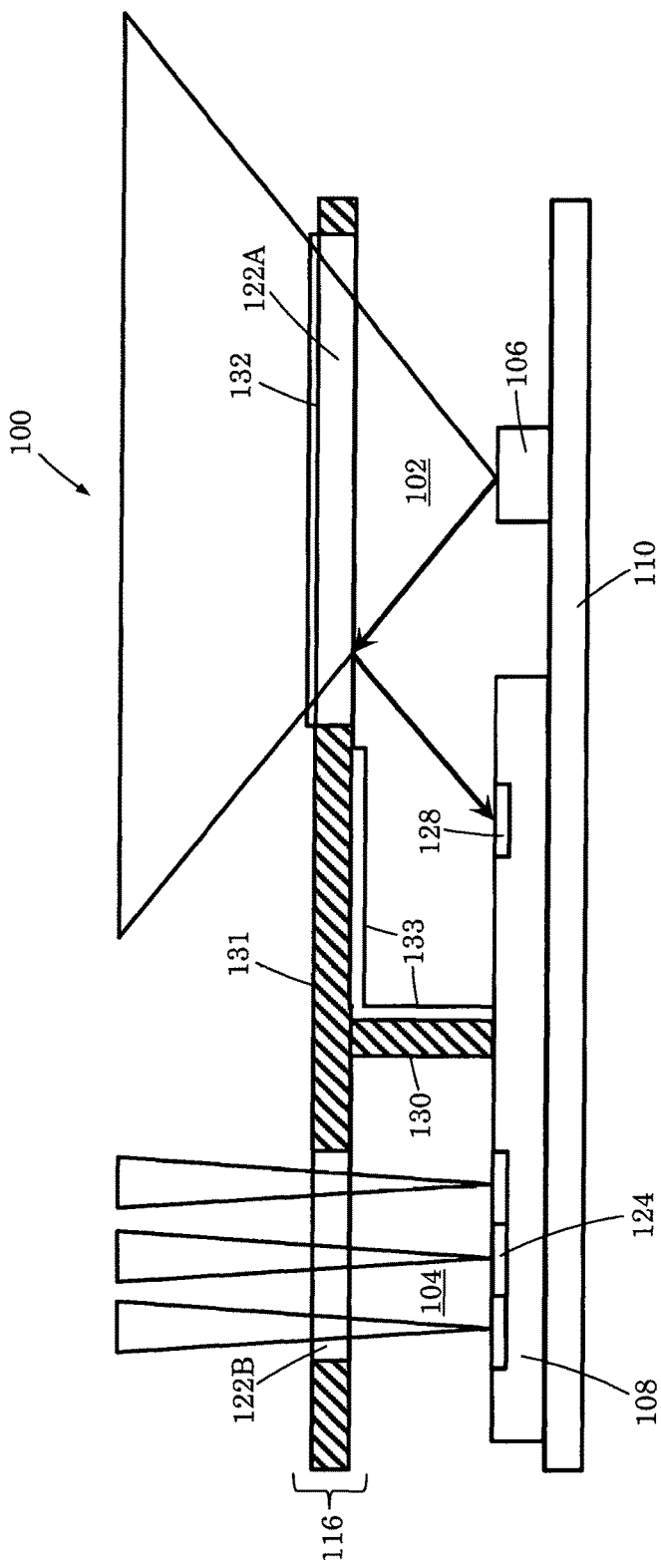
FIG. 2 illustrates an example of an optoelectronic module according to some implementations of the invention.

FIG. 2 illustrates an example of an optoelectronic module 100 that includes a light emission channel 102 and a light detection channel 104. A light emitter chip 106 and a TOF sensor chip 108 are mounted on a first side of a printed circuit board (PCB) 110. The light emitter 106 is an example of an illumination source. In some cases, the light emitter 106 is operable to generate coherent, directional, spectrally defined light emission. Examples of the light emitter 106 are a laser diode or a vertical cavity surface emitting laser (VCSEL).

An optics member 116 spans across the channels 102, 104 and includes transmissive windows 122A, 122B that are substantially transparent to a wavelength of light (e.g., infra-red radiation) emitted by the emitter 106. In some instances, as shown in FIG. 2, the emitter and detector windows 122A, 122B are separated from one another by an opaque or substantially non-transmissive region 131 that forms part of the optics member 116. Light from the emitter 106 is directed out of the module through the emitter window 122A and, if reflected by an object back toward the module's detection channel 104, can be sensed by the TOF sensor 108.

The TOF sensor 108 can include an array of spatially distributed light sensitive elements (e.g., active demodulation detection pixels) 124 as well as one or more light sensitive reference pixels 128. Both the detection pixels 124 and the reference pixels 128 are able to sense light at a wavelength emitted by the emitter 106. The detection pixels 124 provide the primary signals for determining the distance to an object outside the module. Signals from the reference pixels 128 can be used to compensate for drift and/or to provide a zero distance measurement. The sensor 108 can be implemented, for example, using charge-coupled device (CCD) or complementary metal oxide semiconductor (CMOS) technologies. In some cases, the reference pixels 128 are located on the same sensor chip as the detection pixels 124, although in other cases, as discussed below, they may be located on different chips. In some instances, there may be an array of reference pixels (e.g., a single line of pixels or multiple lines of pixels). Typically, there are many fewer reference pixels 128 than detection pixels 124.

The emitter 106 and the TOF sensor 108 can be connected electrically to the PCB 110, for example, by conductive pads or wire bonds. The PCB 110, in turn, can be connected electrically to other components within a host device (e.g., a smart phone or tablet).

In the example of FIG. 2, a vertical shield (i.e., light barrier) 130 extends between the optics member 116 and the surface of the TOF sensor 108. The shield 130, which substantially attenuates the light or is non-transparent (i.e., opaque) to the light emitted by the emitter 106, is disposed such that detection pixels 124 are located to one side of the shield and the reference pixels are located to the other side of the shield. The reference pixels 128 are thus disposed in the emission chamber 102 on the same side of the shield 130 as the emitter 106. The detection pixels 124, however, are disposed on the other side of the shield 130 in the detection chamber 104. This arrangement allows a small amount of light from the emitter 106 to be reflected by the transmissive window 122A for sensing by the reference pixels 128 without introducing optical cross-talk from the emission chamber 102 to the detection pixels 124.

In the illustrated example of FIG. 2, the non-transmissive section 131 of the optics member 116 between the transmissive windows 122A, 122B can be composed of the same material as the light barrier 130.

In some implementations, one or more surfaces of the emission chamber 102 are coated with an optical filter, a partially-reflective coating, an anti-reflective coating and/or an anti-scratch coating. For example, the emitter window 122A can include a coating 132, such as an optical filter coating, an anti-reflective coating and/or a non-transparent coating (e.g., black chrome), disposed on its top or bottom side (or on both sides). In some situations, both sides of the emitter window 122A have the same coating provided thereon. In other cases, the top and bottom sides of the emitter window 122A have different coatings. Further, in some instances, one or both sides may have two (or more) different coatings. The coating(s) may be partially reflective to some wavelengths of light (i.e., wavelength(s) that can be detected by the reference pixels). Thus, for example, some of the light reflected by the emitter window 122A can be incident on the reference pixels 128. In some implementations, a passive optical element is mounted on, or incorporated into, the emitter window 122A. Examples of such a passive optical element include a reflective patch, a diffractive optical element, and/or a refractive optical element such as a prism.

Instead of, or in addition to, providing a partially reflective coating on a surface of the emitter window 122A, a reflective coating 133 can be provided on the surface of the light barrier 130 or the non-transmissive region 131 of the optics member 116. Such a reflective coating can help direct some of the emitter light toward the reference pixels 128.

When light from the emitter 106 is reflected by the emitter window 122A or other surface of the emission chamber 102 toward the reference pixels 128, such light preferably is not incident on the detection pixels 124. In some cases, such as the implementation of FIG. 2, the light barrier 130 helps prevent light reflected by the emitter window 122A from being incident on the detection pixels 124.

Although the light barrier 130 can help reduce optical cross-talk between the detection pixels 124 and the reference pixels 128, incorporating the light barrier into the module 100 may increase the overall footprint and/or height of the module. Thus, in some instances, it may be desirable to provide the advantages of using reference pixels 128 without the need for the light barrier 130. In such cases, other techniques can be used to address the issue of optical cross-talk. Examples of these other techniques are described below and can be used together with, or instead of, the light barrier 130.

Figure 3:
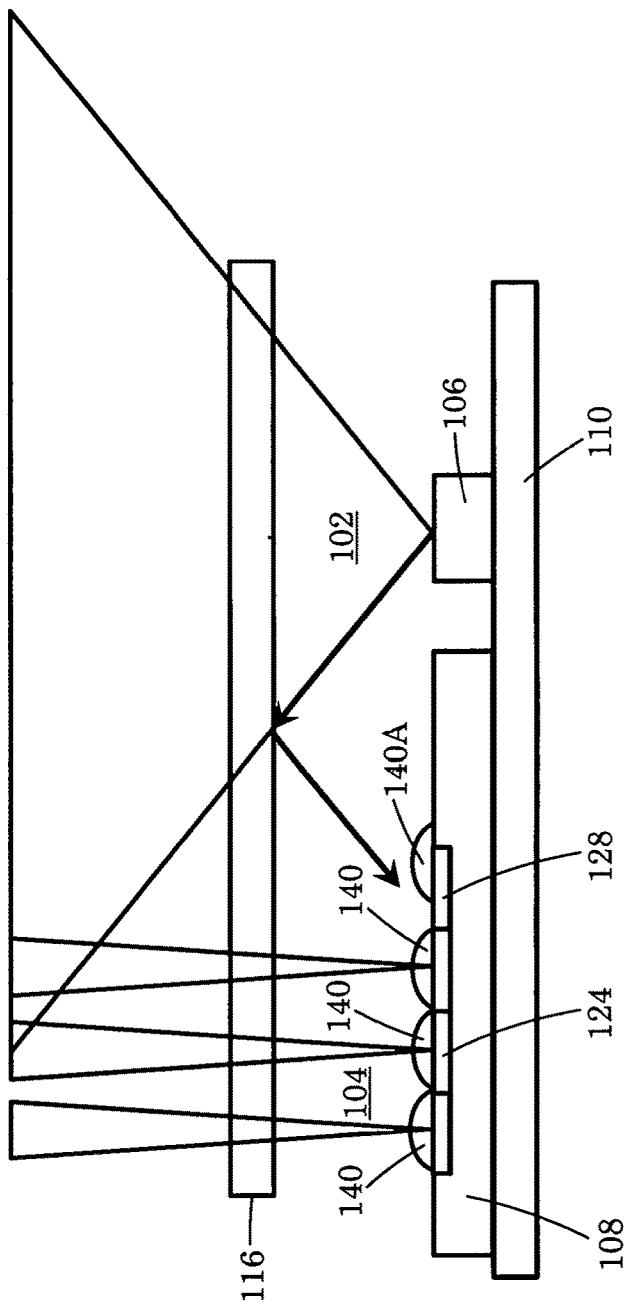
FIG. 3 illustrates another example of an optoelectronic module according to some implementations of the invention.

In the implementation of FIG. 2, the detection pixels 124 may have a relatively broad field of view (FOV) such that they sense incoming light from a broad angle. In some instances (e.g., in a module without the light barrier 130), it can be advantageous to narrow the FOV of the detection pixels 124 to reduce the amount of optical cross-talk sensed by the pixels 124. This can be achieved, for example, by providing one or more micro lenses 140 over the detection pixels 124 (see FIG. 3).

In some instances, a micro lens 140A also can be placed over the reference pixels 128. By displacing the micro lens 140A slightly in the direction of the emitter 106, the reference pixels 128 can collect more light from the emitter. Such an arrangement also can help reduce the amount of optical cross-talk sensed by the reference pixels 128. In some implementations, the micro lens over the reference pixels is omitted.

In some cases, providing micro lenses 140 to narrow the FOV of the detection pixels 124 can obviate the need for a light barrier 130 (see FIG. 2) to prevent light reflected by the emitter window 122A from being incident on the detection pixels 124. In implementations that do not include the light barrier 130, the section 131 of the optics member 116 that substantially attenuates or is non-transparent to light emitted by the emitter 106 also can be omitted such that the transmissive widows 122A, 122B are not separated from one another by an opaque or non-transparent section 131. Eliminating the need for the light barrier 130 can help reduce the overall size of the module, which can be advantageous for applications in which the module is to be integrated into a handheld device such as a smart phone or tablet in which space is at a premium.

Figure 4:
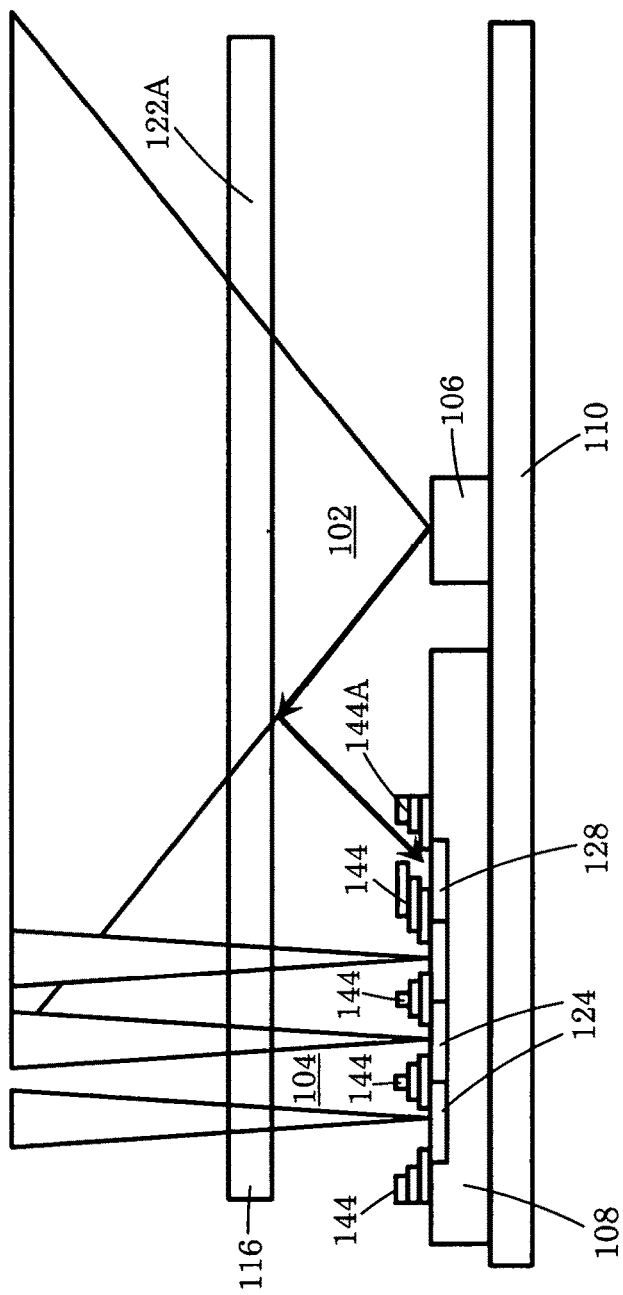
FIG. 4 illustrates a further example of an optoelectronic module according to some implementations of the invention.

In some implementations, stacks 144 can be provided as shields around one or more of the pixels 124, 128 (see FIG. 4). The stacks 144, which can be composed, for example, of metal or other layers, can help define the FOV for the detection pixels 124 and can help reduce optical cross-talk caused by emitter light reflected toward the detection pixels. Likewise, the stack 144 around the reference pixels 128 can help ensure that light reflected by the emitter window 122A is incident on the reference pixels, but that light reflected by an object outside the module is not incident on the reference pixels. A respective stack 144 can partially, or completely, surround each individual pixel 124, 128 laterally. Further, the stacks 144 can be provided instead of, or in addition to, the micro lenses 140, 142 of FIG. 3.

Figure 5:
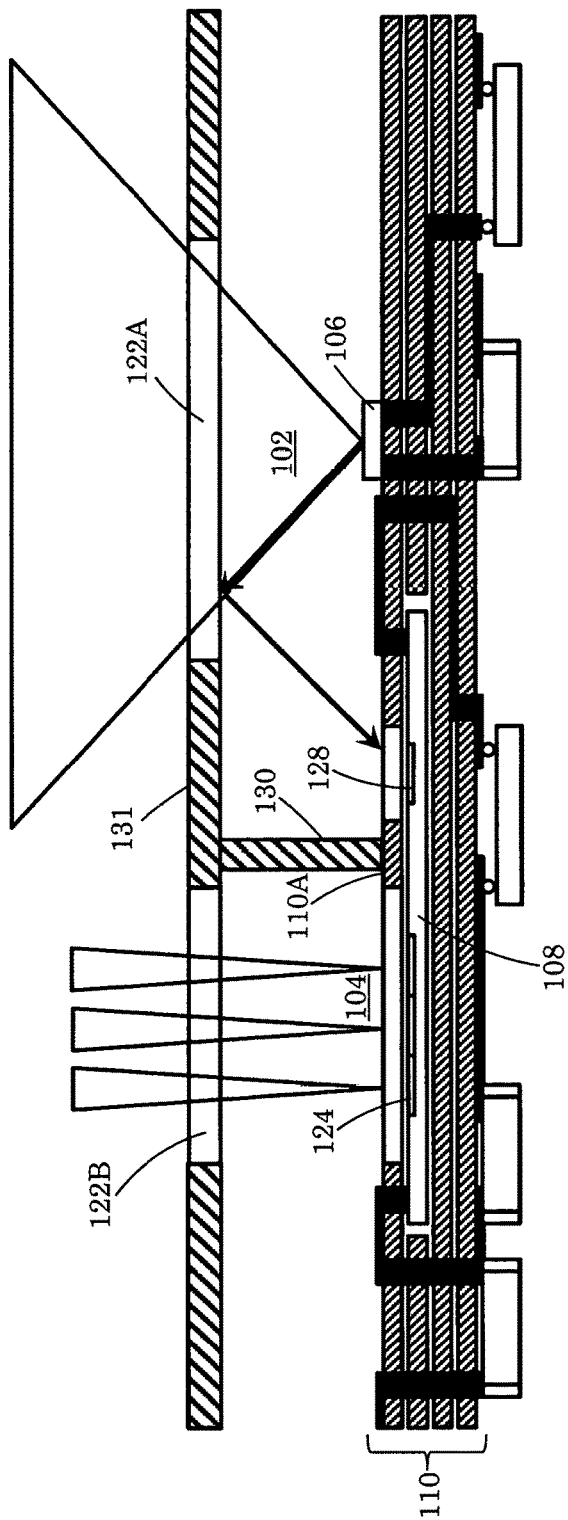
FIGS. 5-7 illustrated additional examples of optoelectronic modules according to some implementations of the invention.

In some instances, as illustrated in FIG. 5, the sensor chip 108 can be embedded within layers of the PCB 110. Such an arrangement can facilitate optical separation of the reference pixels 128 from the active detection pixels 124, thereby reducing optical cross-talk. Further, one or more layers 110A of the PCB stack 110 itself can be used to provide optical separation between the reference and detection pixels. By embedding the sensor chip 108 within the PCB 110, design of the light barrier can be made easier because considerations related to material and mechanical stress tend to be less important in view of the inherent protection of the sensor 108 by the PCB 110. Further, by using layers 110A of the PCB 110 to provide the optical separation, the overall height of the module can be kept relatively small.

Figure 6:
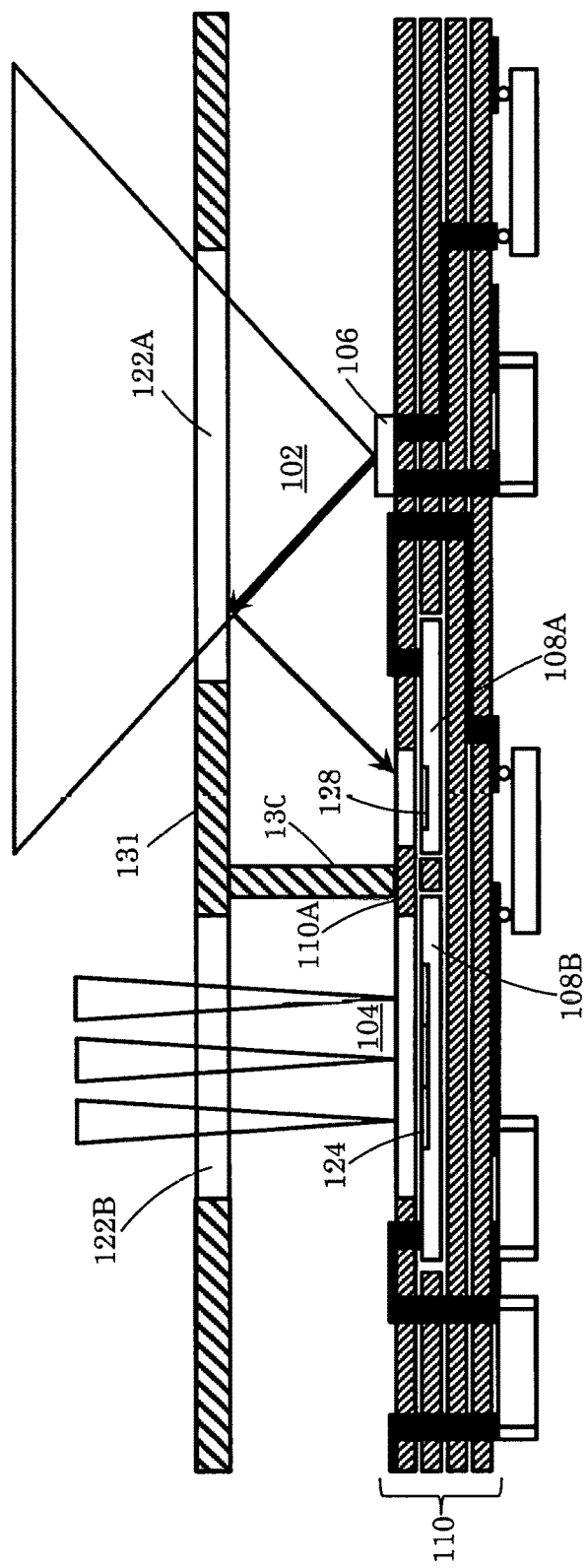

In the foregoing examples (including the example of FIG. 5), a single sensor chip 108 includes both the active detection pixels 124 and the reference pixels 128 (as well as the control logic, decoder logic and read-out logic). In other implementations, the reference pixels 128 are integrated into a chip 108A separate from the chip 108B containing the active detection pixels 124 (see FIG. 6). Each of the chips 108A, 108B, which can be embedded within the PCB 110, also can include appropriate control logic, decoder logic and/or read-out logic. Embedding the sensor chip(s) within the PCB layers can be combined, for example, with other techniques described here (e.g., a partially reflective or other coating on a surface of the emission chamber; the addition of micro lenses 140, 142 over the pixels; the addition of reflective layers 144 around the pixels).

Figure 7:
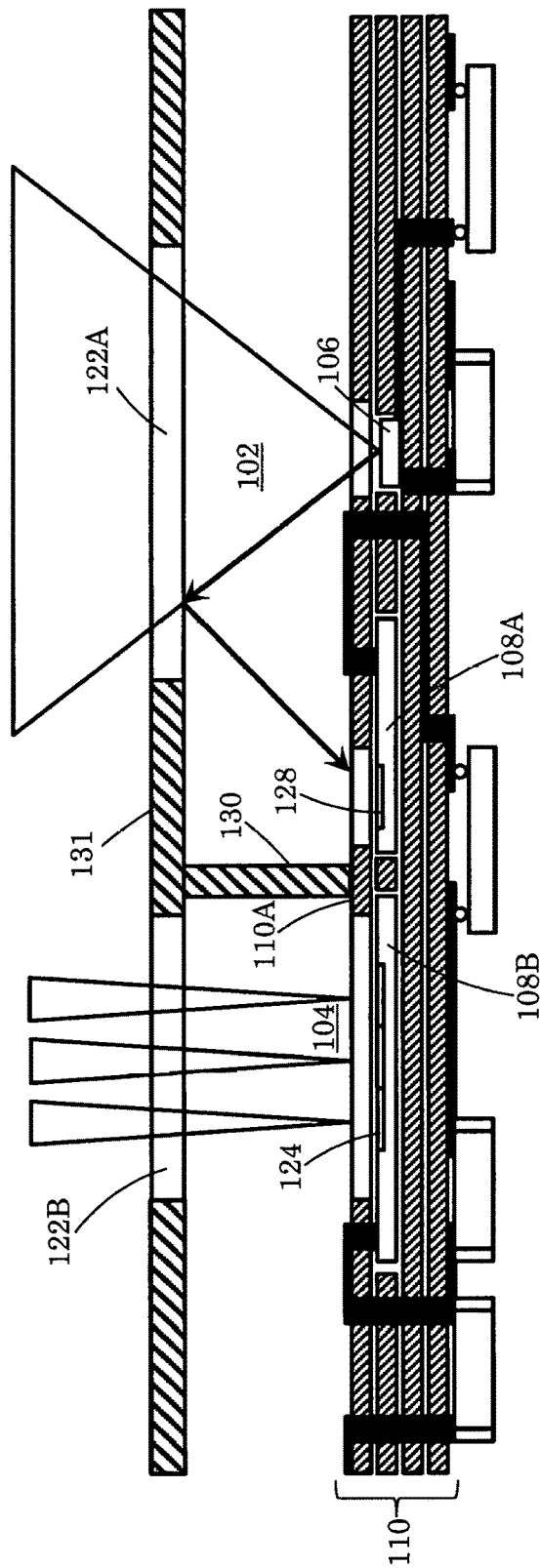

In some instances, in addition to embedding the sensor chip(s) 108A, 108B in the PCB 110, the emitter chip 106 also can be embedded with the PCB layers (see FIG. 7).

Embedding the sensor and/or emitter chips 108, 106 within the PCB 110 can achieve other advantages in some instances. For example, the need for bonding wires can be obviated. Eliminating the need for bonding wires, which tend to be vulnerable to mechanical vibrations, can be useful. Further, bonding wires introduce parasitic capacitances and inductances, which make high frequency applications more challenging. Thus, eliminating the need for bonding wires can facilitate high frequency applications.

Embedding the sensor and/or emitter chips 108, 106 within the PCB 110 also can help protect the chips better in some implementations because only the passivated chip surfaces of the chips are exposed.

Figure 8A:
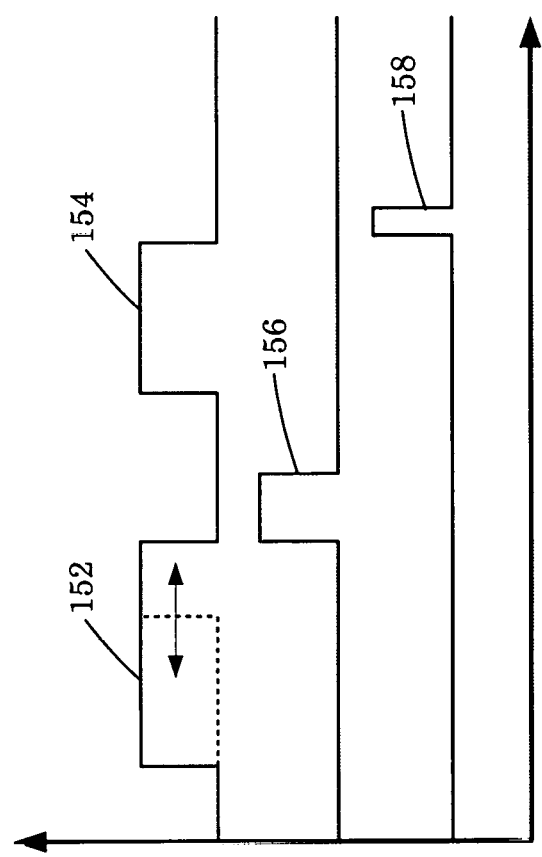
FIGS. 8A-8D illustrate examples of integration timing diagrams.

In some implementations, the active detection pixels 124 and the reference pixels 128 may have integration times (i.e., exposure times) that occur simultaneously. However, in other cases, the module can use multiple non-overlapping integration times (e.g., one for the active detection pixels 124 and another for the reference pixels 128). An example of the timing for such an implementation is illustrated in FIG. 8A. In some cases, a variable integration period 152 can be used for the active detection pixels 124, whereas a fixed integration period 154 can be used for the reference pixels 128. The exposure time for the detection pixels 124 can be adjusted, for example, to reduce the signal-to-noise (S/N) ratio based on the level of signals reflected by objects in the scene 26. The active pixels 124 can be read out, for example, during a first period 156, and the reference pixels 128 can be read out during a second period 158. The duration of the read out time may be a function, for example, of the pixel(s) size.

Figure 8B:
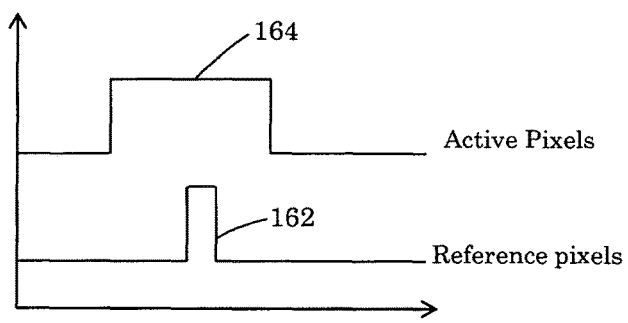
Figure 8C:
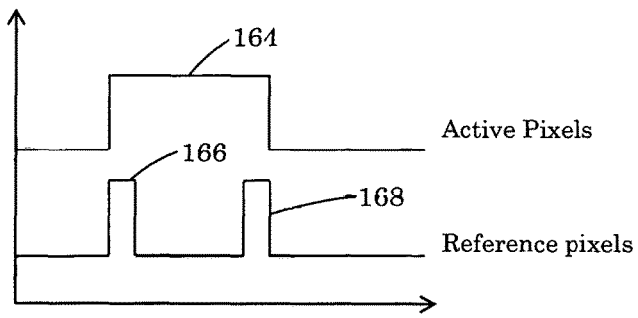

In some implementations, the sensor's control circuitry is configured to tune the integration times of the reference pixels so as achieve an affective sensitivity for the pixels. Varying the integration times for the reference pixels can provide an alternative to varying the aperture size of the pixels. For example, a longer integration period may correspond to pixel having a relatively large aperture, whereas a smaller integration period may correspond to a pixel having a relatively small aperture. In some cases, tunable integration times can be used to initiate (or end) the reference pixel integration period at a specified time relative to the integration period of the active detection pixels. FIGS. 8B-8C illustrates examples that can be achieved using tunable integration times for the reference pixels. As illustrated in the example of FIG. 8B, the reference pixel integration 162 occurs during the middle of the active pixel integration 164. In contrast, as shown in the example of FIG. 8C, the reference pixel integration occurs for short periods 166, 168 at the beginning and at the end of the active pixel integration period 164, which can result in averaging of the thermal phase shift of the emitter 106 that occurs over time. In some instances, a particular reference pixel is integrated during both integration periods 166, 168. In other cases, a first reference pixel may be integrated during the first integration period 166, and a different second pixel may be integrated during the second integration period 168.

Figure 8D:
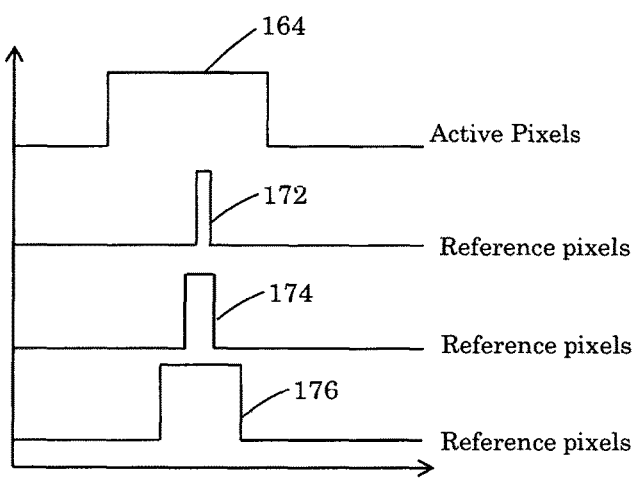

In some cases, such as where the sensor 108 has multiple reference pixels 128, the sensor's control circuitry can control the reference pixels such that different pixels have integration periods of different duration. FIG. 8D illustrates an example, in which a first reference pixel (or subset of reference pixels) integrates during a first integration period 172 having a first duration, a second reference pixel (or subset of reference pixels) integrates during a second integration period 174 having a second duration longer than the first integration period, and a third reference pixel (or subset of reference pixels) integrates during a third integration period 176 having a third duration longer than the second integration period. In the illustrated example, each of the pixels is integrated at a time near the middle of the integration period for the active pixels, although this need not be the case for all implementations. Further, each of the integration periods 172, 174, 176 is shorter than the integration period 164 for the active pixels.

The dynamic range of the sensor depends on the maximum amount of charge that each pixel can accumulate. Thus, for some implementations, the dynamic range of the sensor can be increased by increasing the maximum charge capability of the reference pixels 128.

In the foregoing examples, various techniques are described to help isolate the detection pixels 124 and reference pixels 128 optically from one another so as to reduce optical cross-talk (i.e., to reduce the amount of light reflected, for example, by the emission window 122A that is sensed by the detection pixels 124, and to reduce the amount of light reflected by an object in the scene 26 that is sensed by the reference pixels 128). Nevertheless, as described below, in some implementations, even when such optical cross-talk is present, it is possible to determine the phase difference, and thus the distance to an object in the scene.

Figure 9:
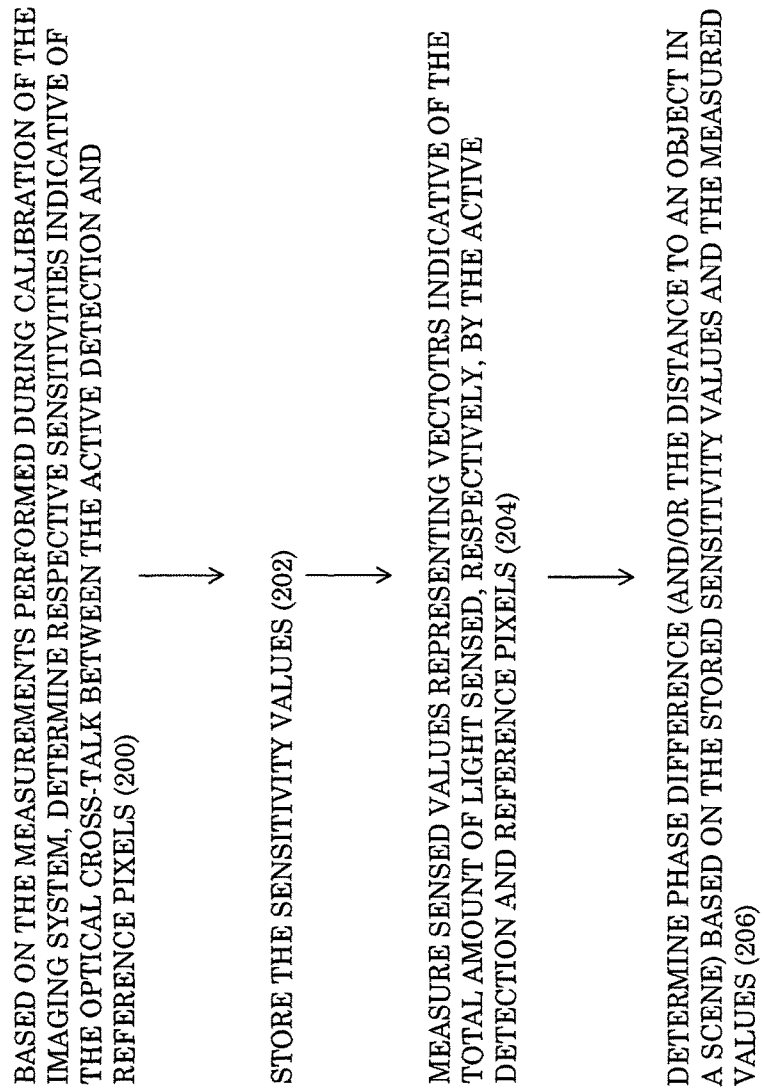
FIG. 9 is a flow chart of a method for determining a phase difference in some implementations of the invention.

For example, based on prior calibrations of the imaging system, it can be determined that a particular detection pixel 124 has a first sensitivity a defined as the ratio of two sensed signals (Aref/Bref) each of which results from light reflected by the emission window 122A (or other surface of the emission chamber) (FIG. 9, block 200). In this case, Aref represents the component of light sensed by the detection pixel 124 resulting from light reflected by the emission window 122A (or other surface of the emission channel), and Bref represents the component of light sensed by a particular reference pixel 128 resulting from the light reflected by the emission window 122A (or other surface of the emission channel). Likewise, based on prior calibrations of the imaging system, it can be determined that the reference pixel 128 has a second sensitivity 13 defined as the ratio of two sensed signals (Aobj/Bobj) each of which results from light reflected by an object in the scene 26. In this case, Aobj represents the component of light sensed by the reference pixel 128 resulting from light reflected by the object in the scene 26, and Bobj represents the component of light sensed by the detection pixel 124 resulting light reflected by the object in the scene. In general, each of α and β will have respective values between 0 and 1, and typically should have values closer to 0. Thus, the sensitivities α and β represent indications of the optical cross-talk that occurs between the reference and active detection pixels. The values for α and β can be stored by logic or memory in the imaging system (FIG. 9, block 202).

Figure 10:
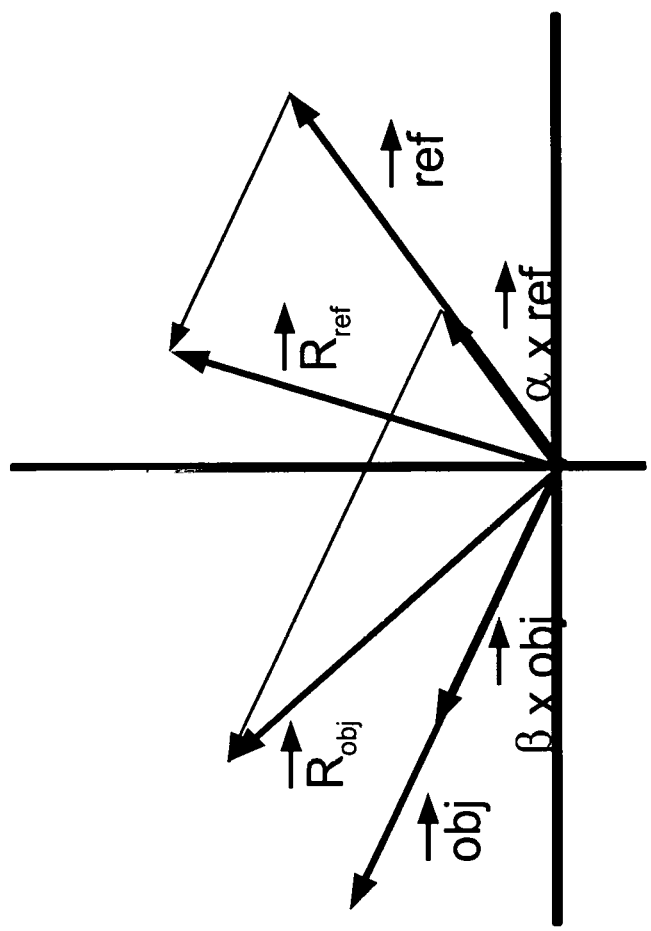
FIG. 10 is a vector graph illustrating vectors to assist in understanding the method of FIG. 9.

In the following discussion, it is assumed that the two pixels (i.e., the detection pixel and the reference pixel) have different sensitivities from one another (i.e., that a and (are different). Signals sensed by each of the two pixels are measured and read out to obtain a reference vector $\vec{R}_{ref}$ and an object vector $\vec{R}_{obj}$, respectively (see FIG. 9, block 204; FIG. 10). Each of these vectors represents the total amount of light detected, respectively, by the reference pixel 128 or the detection pixel 124, and thus each vector represents the sum of the two signal components sensed by the particular pixel (i.e., a first component of light sensed by the pixel resulting from the light reflected by the emission window 122A (or other surface of the emission chamber) and a second component of light sensed by the same pixel resulting from light reflected by an object in the scene 26). Although the two signal components are superposed on one another, the phase φ, and thus the distance to the actual object in the scene, can be calculated by the sensor's processing logic as follows:

$$\varphi = phase(\vec{obj}/\vec{ref}),$$

where:

$$\vec{obj} = (\vec{R}_{obj} - \alpha \times \vec{R}_{ref})/(1 - \alpha \times \beta)$$

$$\vec{ref} = (\vec{R}_{ref} - \beta \times \vec{R}_{obj})/(1 - \alpha \times \beta)$$

(See FIG. 9, block 206) To obtain advantageous use of the foregoing technique for determining the phase difference, the sensitivities α and β for the various pixels should be substantially independent of the environment in which the sensor module is located.

Figure 11:
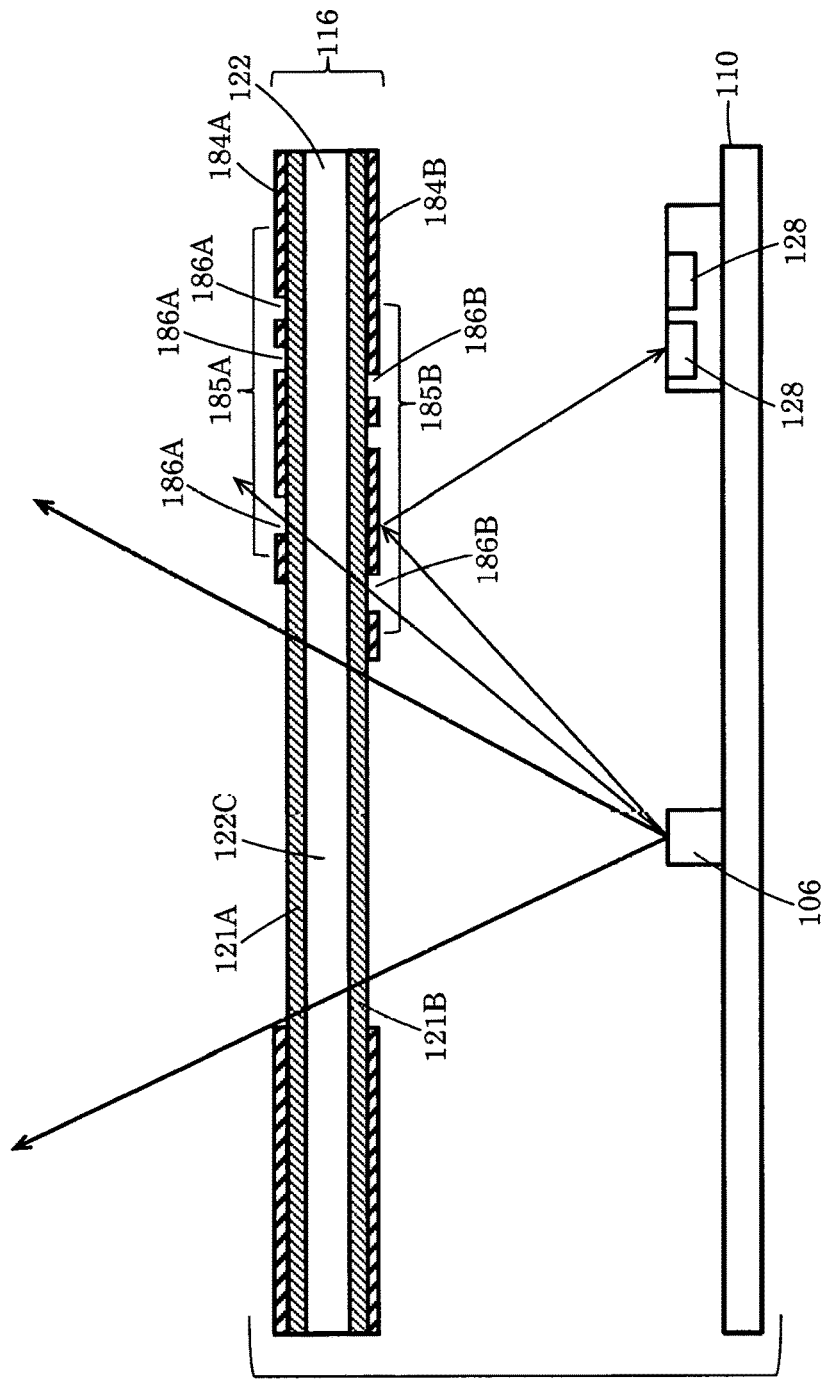
FIG. 11 illustrates another example of an optoelectronic module according to some implementations of the invention.

FIG. 11 illustrates a portion of an optoelectronic module that has a sensor including reference pixels 128. In this example, the optics member 116 includes a transmissive cover (e.g., a cover glass) 122 above the PCB substrate 110. Both sides of the cover glass 122 are coated, for example, with optical filters 121A and 121B, respectively. The optical filters 121A and 121B can filter a particular wavelength or range of wavelengths of light emitted by the emitter 106. Further the optical filters 121A, 121B are coated, for example, with black chrome 184A, 184B to prevent cross-talk via the cover glass 122. Respective parts of the filters 121A, 121B are not covered with the black chrome so as to define a transmissive window 122C that allows light from the emitter 106 to pass out of the module. The presence of the black chrome coating 184B on the sensor-side of the optics member 116 also can help enhance the amount of light that reflects from the optical filter 121B toward the reference pixels 128. In some cases, to reduce the likelihood that too much emitter light is reflected by the black chrome layer 184B onto the reference pixels 128, the black chrome layer 184B can be provided as a pattern 185B with openings (e.g., dots, lines, concentric circles) so as to reduce the amount of light incident on the reference pixels 128. Further, the black chrome layer 184A can be provided as a pattern 185A with openings (e.g. dots, lines, concentric circles) so as to reduce the amount of light incident on the reference pixels 128. As illustrated in the example of FIG. 11, the patterns 185A, 185B include openings 186A, 186B where there is no black chrome. Thus, while the presence of the black chrome coating 184A, 184B can enhance the amount of light reflected to the reference pixels 128, providing part of the black chrome coating as a pattern 185A, 185B can be used to prevent too much light from being incident on the reference pixels 128. In some implementations, the black chrome layers 184A, 184B need not be provided as patterns 185A, 185B with openings. For example, the chrome layers 184A, 1854 may be provided as a single opening such as a circle, square or other geometric shape.

Use of the features and techniques in the foregoing implementations can result, in some instances, in small sensor modules (i.e., having a small height and/or a small footprint). Further, the foregoing implementations can help reduce or eliminate optical cross-talk. Such small modules can be integrated advantageously into devices such as smart phones, tablets, and other host devices in which space is at a premium.

Various modifications can be made to the foregoing examples. Further, features from the different examples can, in some instances, be integrated in the same module. Other implementations are within the scope of the claims.

What is claimed is:

1. An optoelectronic module comprising:
   an illumination source;
   a sensor including spatially distributed detection pixels and at least one reference pixel;
   an optics member disposed over the illumination source and the sensor, the optics member having a first transmissive region over the illumination source and a second transmissive region over the detection pixels;
   a light barrier separating an emission chamber of the module from a detection chamber of the module, wherein the illumination source and the at least one reference pixel are in the emission chamber, and wherein the detection pixels are in the detection chamber; and
   a partially reflective coating on a surface of the first transmissive region over the illumination source wherein the coating is partially reflective with respect to a wavelength detectable by the reference pixel and is arranged such that some light from the illumination source is reflected by the coating toward the at least one reference pixel.

2. The optoelectronic module of claim 1 including a partially reflective coating on a surface of the first transmissive region facing the illumination source.

3. The optoelectronic module of claim 1 including a partially reflective coating on a surface of the first transmissive region facing away from the illumination source.

4. The optoelectronic module of claim 1 including a partially reflective coating on each of opposite surfaces of the first transmissive region.

5. The optoelectronic module of claim 1 including a reflective coating on a surface of the light barrier facing the illumination source.

6. The optoelectronic module of claim 1 wherein the optics member includes a non-transmissive region separating the first and second transmissive regions, the non-transmissive region having a reflective coating on a surface facing the illumination source and arranged such that some light from the illumination source is reflected by the reflective coating toward the at least one reference pixel.

7. An optoelectronic module comprising:
   an illumination source;
   a sensor including spatially distributed detection pixels and at least one reference pixel;
   an optics member disposed over the illumination source and the sensor, the optics member having a first transmissive region over the illumination source and a second transmissive region over the detection pixels, wherein the first transmissive region has a first coating on a first surface facing the illumination source and a second coating on a second surface facing away from the illumination source;

a light barrier separating an emission chamber of the module from a detection chamber of the module, wherein the illumination source and the at least one reference pixel are in the emission chamber, and wherein the detection pixels are in the detection chamber; and wherein each of the coatings is at least one of an optical filter coating, a partially-reflective coating, an anti-reflective coating or a non-transmissive coating.

8. The optoelectronic module of claim 7 wherein at least one the first or second coating comprises black chrome.

9. The optoelectronic module of claim 7 including a respective black chrome coating on each of opposite surfaces of the first transmissive region.

10. The optoelectronic module of claim 7 wherein each of the one of more surfaces of the first transmissive region has a black chrome coating and an optical filter coating thereon.

11. The optoelectronic module of claim 7 further including a passive optical element mounted on, or incorporated into, the first transmissive window.

12. The optoelectronic module of claim 11 wherein the passive optical element includes at least one of a reflective patch, a diffractive optical element, or a refractive optical element.

* * * * *